(12) United States Patent  (10) Patent No.: US 7,068,499 B2
Aisenberg  (45) Date of Patent: Jun. 27, 2006

(54) MODULAR COMPUTER USER INTERFACE SYSTEM

(75) Inventor: Alain Aisenberg, Bay Harbor Island, FL (US)

(73) Assignee: Chrono Data LLC., Las Vegas, NV (US)

( * ) Notice: Subject to any disclaimer, the term of this patent is extended or adjusted under 35 U.S.C. 154(b) by 153 days.

(21) Appl. No.: 10/785,717

(22) Filed: Feb. 24, 2004

(65) Prior Publication Data

US 2004/0233624 A1    Nov. 25, 2004

Related U.S. Application Data

(63) Continuation-in-part of application No. 09/888,357, filed on Jun. 25, 2001, now Pat. No. 6,697,251.

(51) Int. Cl.
*G06F 1/16*    (2006.01)

(52) U.S. Cl. ...................... 361/683; 361/680; 345/158

(58) Field of Classification Search ................ 361/683, 361/680; 345/158
See application file for complete search history.

(56) References Cited

U.S. PATENT DOCUMENTS

| | | | |
|---|---|---|---|
| 4,689,761 A | 8/1987 | Yurchenco | |
| 5,341,154 A | 8/1994 | Bird | |
| 5,402,121 A | 3/1995 | Noorbehesht | |
| 5,764,474 A | 6/1998 | Youens | |
| 5,793,355 A * | 8/1998 | Youens | 345/157 |
| 6,040,977 A | 3/2000 | Hoffer | |
| 6,163,326 A | 12/2000 | Klein et al. | |
| 6,262,716 B1 | 7/2001 | Raasch | |
| 6,292,358 B1 | 9/2001 | Lee et al. | |
| 6,307,740 B1 | 10/2001 | Foster et al. | |
| 6,462,937 B1 | 10/2002 | Liao et al. | |
| 6,493,218 B1 * | 12/2002 | Fraga et al. | 361/683 |
| 6,538,880 B1 * | 3/2003 | Kamijo et al. | 361/686 |
| 6,605,924 B1 * | 8/2003 | Tanaka et al. | 361/683 |
| 6,798,647 B1 * | 9/2004 | Dickie | 361/683 |
| 2002/0167482 A1 * | 11/2002 | Yin | 345/156 |

* cited by examiner

*Primary Examiner*—Lisa Lea-Edmonds

(57) ABSTRACT

A modular computer user interface system particularly adaptable for use with portable computers and comprising the integration therewith of at least one, but in certain specific embodiments, a plurality of auxiliary modules, such as keypads, interfaced with the processor independent of the conventional keyboard. The one or more auxiliary modules may be permanently secured to the platform of the portable computer in spaced, segregated relation to the keyboard and keys associated therewith. Alternatively, one or more of the auxiliary modules may be removably mounted on or detachably connected to the platform and keyboard, wherein regardless of their fixed, removable or detached relation to the platform of the computer, each of the auxiliary modules are independently operable to effect data and signal communication with the central processor of the computer, independent of operation of the conventional keyboard. The plurality of auxiliary modules may each be independently structured to perform various functions and therefore are independently operative as a numerical keypad, a proprietary keypad for processing specialized software and/or another type of user interface module.

23 Claims, 8 Drawing Sheets

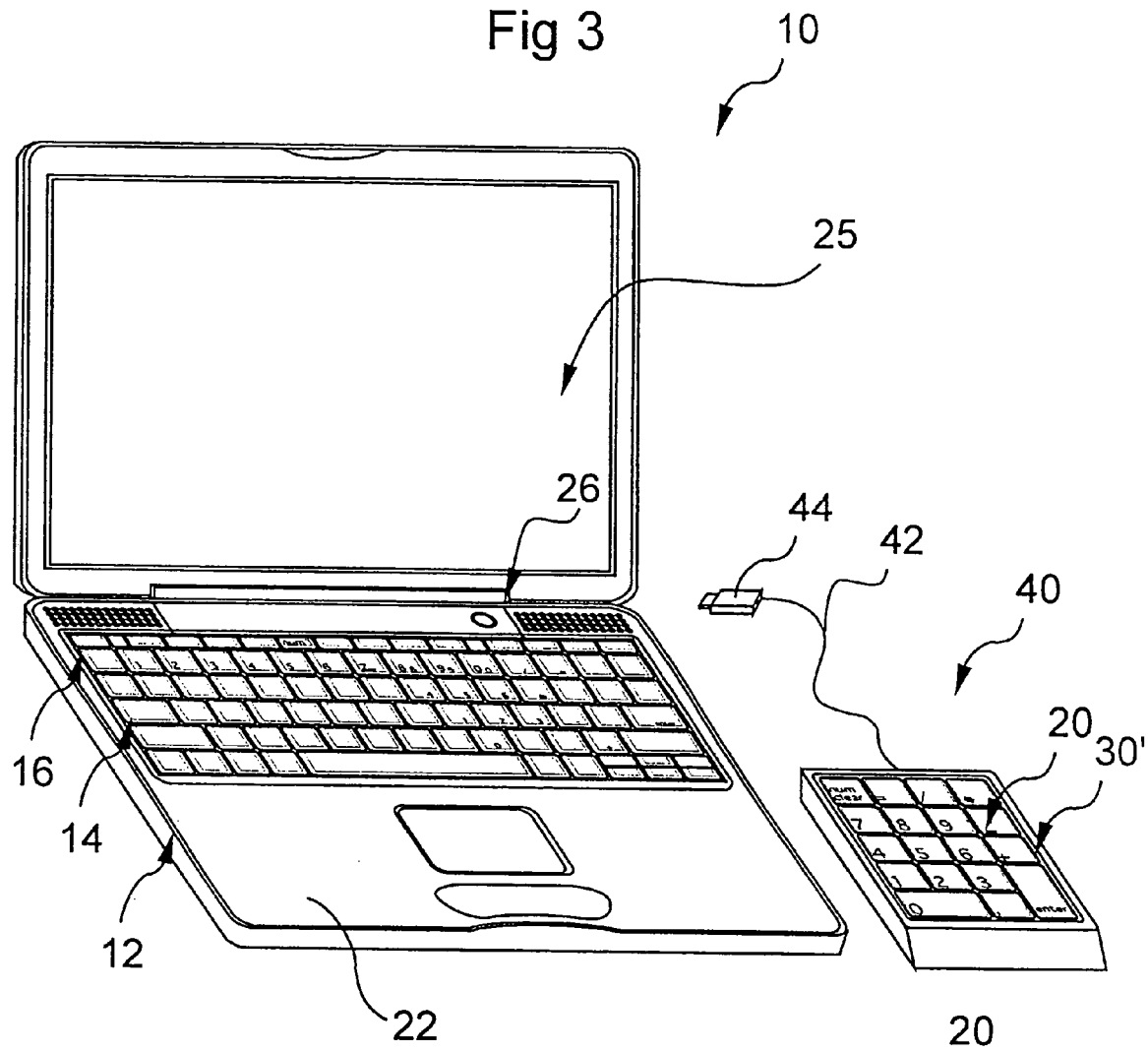
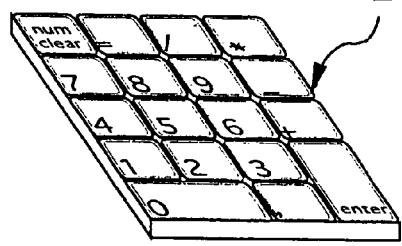
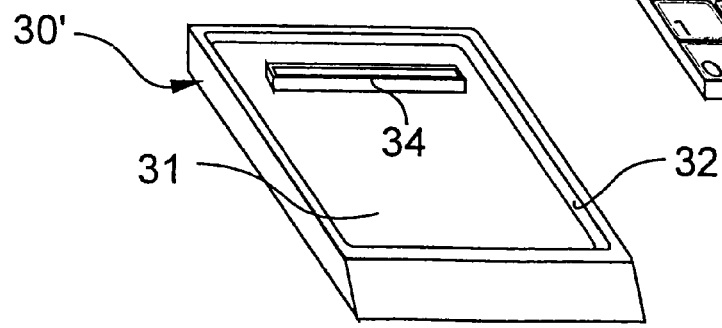
Fig 3
Fig 4
Fig 4A

Fig 8
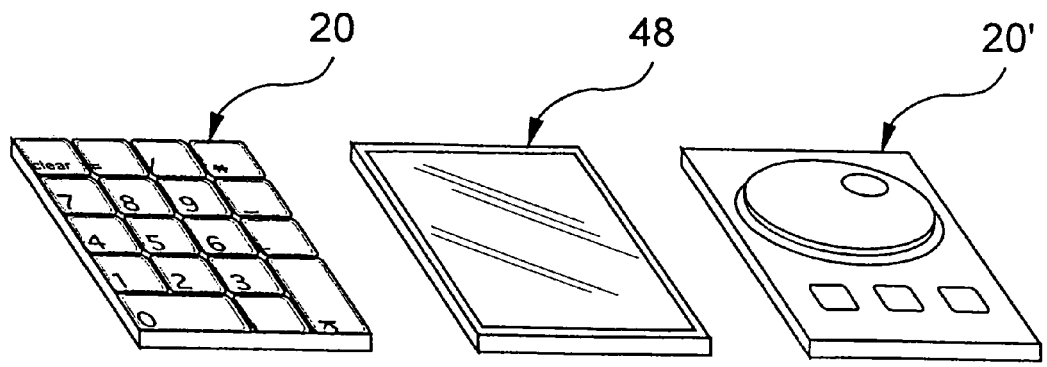
Fig 8A    Fig 8B    Fig 8C
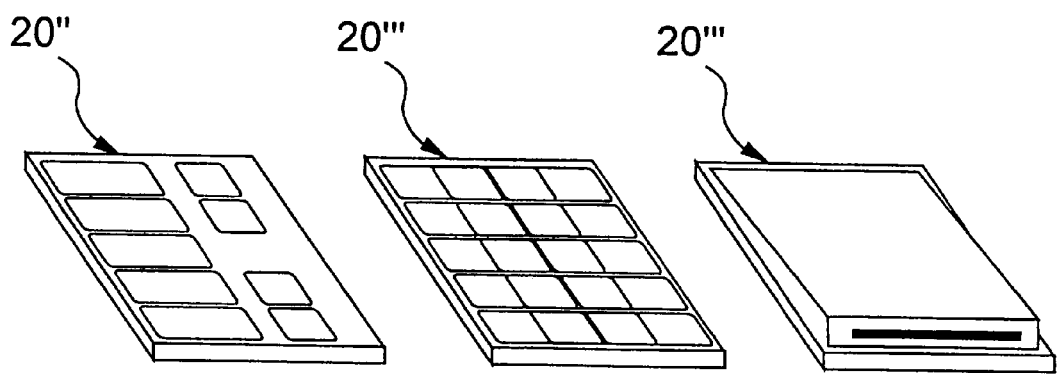
Fig 8D    Fig 8E    Fig 8F
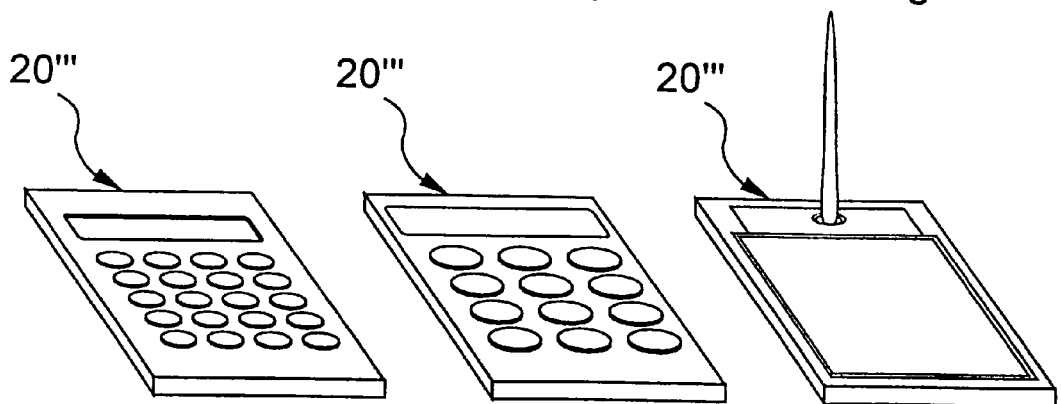
Fig 8G    Fig 8H    Fig 8I

MODULAR COMPUTER USER INTERFACE SYSTEM

CLAIM OF PRIORITY

The present application is a continuation-in-part application of previously filed, pending patent application having Ser. No. 09/888,357 filed on Jun. 25, 2001, which is set to mature into U.S. Pat. No. 6,697,251 on Feb. 24, 2004 incorporated herein by reference.

BACKGROUND OF THE INVENTION

1. Field of the Invention

The present invention relates to a modular computer user interface system assembly specifically, but not exclusively, adaptable for integration with a portable or "lap top" computer and includes one or a plurality of auxiliary modules, each operable independently of one another and of the conventional keyboard. The auxiliary modules may be individually structured for a variety of conventional or specialized functions, such as numerical calculations, video editing, specialized software processing, etc.

2. Description of the Related Art

Increasing use of computer technology and substantial advances in computer hardware, compact and/or portable computers, often referred to as laptop computers, are becoming increasingly utilized in a variety of businesses and other activities. To this end, these compact or portable computers are often as powerful as traditional desk top computers, however, their compact nature allows for a degree of portability and transportability, thereby allowing the computer user to effectively make use of their computer at any of a variety locations.

Most traditional lap top computers include a sandwiched type configuration wherein the screen is included on one portion and a keyboard is included on another portion. In an effort to compact the size of these computers, however, and in particular the keyboard portion of the computers, various features and functions normally associated with traditional computer keyboards have been either removed and/or have been overlapped or consolidated into the traditional keyboard. For example, the functions keys and more significantly the numeric keypad typically associated with traditional computer keyboards are often overlapped onto the standard keys operating in a special function which enable utilizing a function type key. To this end, if the user is seeking to utilize the numeric keypad, they are generally prevented from utilizing certain portions of the keyboard, due primarily to the overlapping or combined characteristic of certain alpha and numeric keys. In order to rectify this situation and overcome the disadvantages associated there with, others in the art have attempted to integrate numeric keypad into control items that may be secured to the compact computer. For example, a hand or wrist support structure may be provided and secured to the lap top computer, wherein this auxiliary support structure includes the numeric keypad integrally built therein. Unfortunately, however, such peripheral devices may in some situations defeat the purpose and advantages of the compact portable computing configuration, and users may often find themselves with the need for the numeric keypad, but not the auxiliary support device.

As a result, there is substantial need in the art for a portable computer system which applies the user with the substantial functionality of a traditional desk top computer, including all of the keyboard capabilities and especially the numeric keypad capabilities in a readily usable and always available manner. Moreover, such a keypad integration should be provided in a manner which does not intrude on the normal operation of the keyboard, but rather provides an auxiliary module in an available orientation when needed.

In addition to the above, portable computer users frequently have need for specialized functions in addition to the traditional keypad functions, such as the numeric keypad. As only one example, it is also recognized that certain software programs are sufficiently advanced so as to increase the functionality of the computers, thereby allowing a variety of different functions and applications to be employed utilizing the portable computer. To this end, it would be beneficial to provide a portable computer system wherein a user is able to selectively and adaptively utilize one or a plurality of different selective and specialize keypad configurations that allow for customized use of the software programs in a more efficient and effective manner. For example, the large video editing facilities and specialized controls that include a variety of different functions, such as track pads and other controls, are often provided.

Accordingly, it would be substantially beneficial to provide a portable computer system which enables the user to selectively employ such specialized controls in a manner which does not detract from the normal use of the keyboard and which is effectively expandable within the normal confines of the compact device. Indeed, it is recognized that such adaptability and selectivity of specialized keypad controls would also be effective in the traditional desk top computer environment, while the user is being provided with a substantial advantage of selectivity and adjustability when performing a variety of different tasks, without requiring a multitude of specialized profile devices which must be connected, disconnected, and reconnected to often hidden computer connection ports.

SUMMARY OF THE INVENTION

The present invention is directed to a modular computer user interface system which is particularly, but not exclusively, adaptable for use with a portable computer of the type commonly known as a "laptop" computer. As is well recognized by users and manufacturers of such portable computers, the numerical keys are typically placed in a linear array along a top row of the plurality of alpha-numeric keys defining the conventional keyboard assembly used with such portable computers. As set forth above, utilization of the conventional number keys of this linear array is both inconvenient and time consuming even to a practiced typist. Accordingly, the modular computer user interface system of the present invention overcomes the problems and recognized disadvantages associated with the conventional keyboard design and structure associated with portable computers.

More specifically, the modular computer user interface system of the present invention comprises at least one auxiliary module such as a keypad, which may be permanently or removably attached to the platform of the computer on which the conventional keyboard is mounted. In the context of the present invention, the referred to "platform" of the computer is meant to include a substantially conventional structure wherein a palm rest portion is located somewhat below and extends along the lower longitudinal dimension of the keyboard. Typically, the palm rest portion and the keyboard are fixedly secured to one another and movable as a unit, relative to a display screen. The display screen may be pivotally connected to the platform of the computer, such that the platform and display screen are disposed in overlapping relation to one another in a manner similar to a folded book or the like. Therefore, the location of the at least one auxiliary module on the platform of the computer is at a distinctly spaced and therefore segregated position relative to the conventional keyboard. Independent operation and/or manipulation of the plurality of keys defining the auxiliary module is thereby facilitated without interfering with the normal operation of the conventional keyboard.

In another preferred embodiment of the present invention a plurality of auxiliary modules may be independently and concurrently mounted on the platform of the computer. Each of the plurality of auxiliary modules are also disposed on the platform, preferably on the palm rest portion thereof, in a distinctly spaced and segregated relation to the conventional keyboard. The implementation of this embodiment also provides for independent operation but substantially concurrent utilization of each of the plurality of modules. By way of example only, one of the auxiliary modules mounted on the palm rest portion or other applicable location on the platform, may include a numerical keypad typically used for calculations and/or the input of numerical data into the processor associated with the computer. At the same time, a second or additional auxiliary module may be mounted on the platform of the computer and be at least partially defined by a plurality of function keys adaptable for the operation or processing of specialized software or data communication with the processor in performing a variety of functions.

Yet another preferred embodiment of the modular computer user interface system of the present invention includes at least one auxiliary module operatively connected to the processor of the computer but specifically structured to be disposed in a detached relation to the platform and/or conventional keyboard. As such, the one auxiliary module may define at least a portion of a peripheral assembly. The peripheral assembly is operatively interconnected to the processor of the computer by a cable, utilizing a uniform serial bus (usb) connection, of the type typically applied in the operative connection of a variety of different peripherals.

This preferred embodiment further includes the provision of an interface assembly which comprises a first adaptor structure, preferably defined by a base to which the usb connection is secured. The interface assembly also includes a second adaptor structure connected to or mounted on the auxiliary module, per se. The first and second adaptor structures include electrical, optical or other communicative connectors for establishing communicative, operative interconnection between the module, the base and when activated, the processor for signal and data communication there between. More specifically the connectors may include any of a variety of different ir, transmitter, male/female, plug/port, multi-pin or other structural type connectors which facilitate, depending upon the specific embodiment utilized, either a substantially permanent communicative connection or a selectively removable connection. Utilizing the latter cooperatively structured, connector components, anyone of the one or more auxiliary modules may be removably but operatively secured to the base of the interface assembly to establish an operative connection with the processor. Greater versatility will therefore be available to the users of portable computers by having a peripherally detached adaptor base usable with anyone of a plurality of different auxiliary modules, each of which are designed and structured to perform different functions and/or operate specialized software, etc., as set forth above.

As with the peripheral assembly embodiment described above, the remaining embodiments of the present invention may all include the utilization of an interface assembly for establishing an operative interconnection between the one or more auxiliary modules and the processor of the portable computer. As related to the various preferred embodiments set forth herein, the interface assembly includes a first adaptor, which may be permanently or removably secured to the platform of the computer and comprises an adaptor base, as set forth above. In addition, the interface assembly also includes a second adaptor structure secured to each of the one or more auxiliary modules. The base, defining the first adaptor and the second adaptor secured to the individual modules are each structured to include the aforementioned type of connectors, or other type of port/plug connector structures, which facilitate either a permanent communicative connection or a removable connection. Therefore, a selective and operative attachment of anyone of the plurality of auxiliary modules may be made with anyone of a plurality of adaptor bases. The greatly increased versatility of the modular computer user interface system of the present invention and its implementation for expanding the operative and functional features of a conventional portable or lap top computer should therefore be apparent.

As also generally stated, the modular computer user interface system of the present invention includes a more simplified embodiment, wherein the interface assembly includes a single first adaptor or base fixedly mounted or secured to the platform of the computer in segregated relation to the conventional keyboard. In this more simplified embodiment, a single module or alternatively a plurality of customized modules may be independently secured to the affixed base by virtue of the second adaptor of the interface assembly connected to each of the one or more auxiliary modules.

Therefore, the modular computer user interface system of the present invention overcomes many if not all of the problems and disadvantages associated with conventional portable or lap top computers, wherein such recognized disadvantages are typically related to the compact nature of the portable computer and the universal structuring thereof which eliminates the provision of a collected array of numerical keys, of the type found on conventional keyboards associated with desk top computers.

These and other features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 3 is another embodiment of the present invention wherein at least one auxiliary module is structured as a detached and removably connected peripheral assembly.

FIG. 4 is a perspective view of a base portion of an interface assembly associated with the peripheral assembly of the embodiment of FIG. 3.

FIG. 4A is a perspective view of an auxiliary module structured to perform a user interface function.

FIGS. 8A–8J are perspective illustrations of a plurality of different auxiliary modules.

Like reference numerals refer to like parts throughout the several views of the drawings.

DETAILED DESCRIPTION OF THE PREFERRED EMBODIMENT

Figure 1:
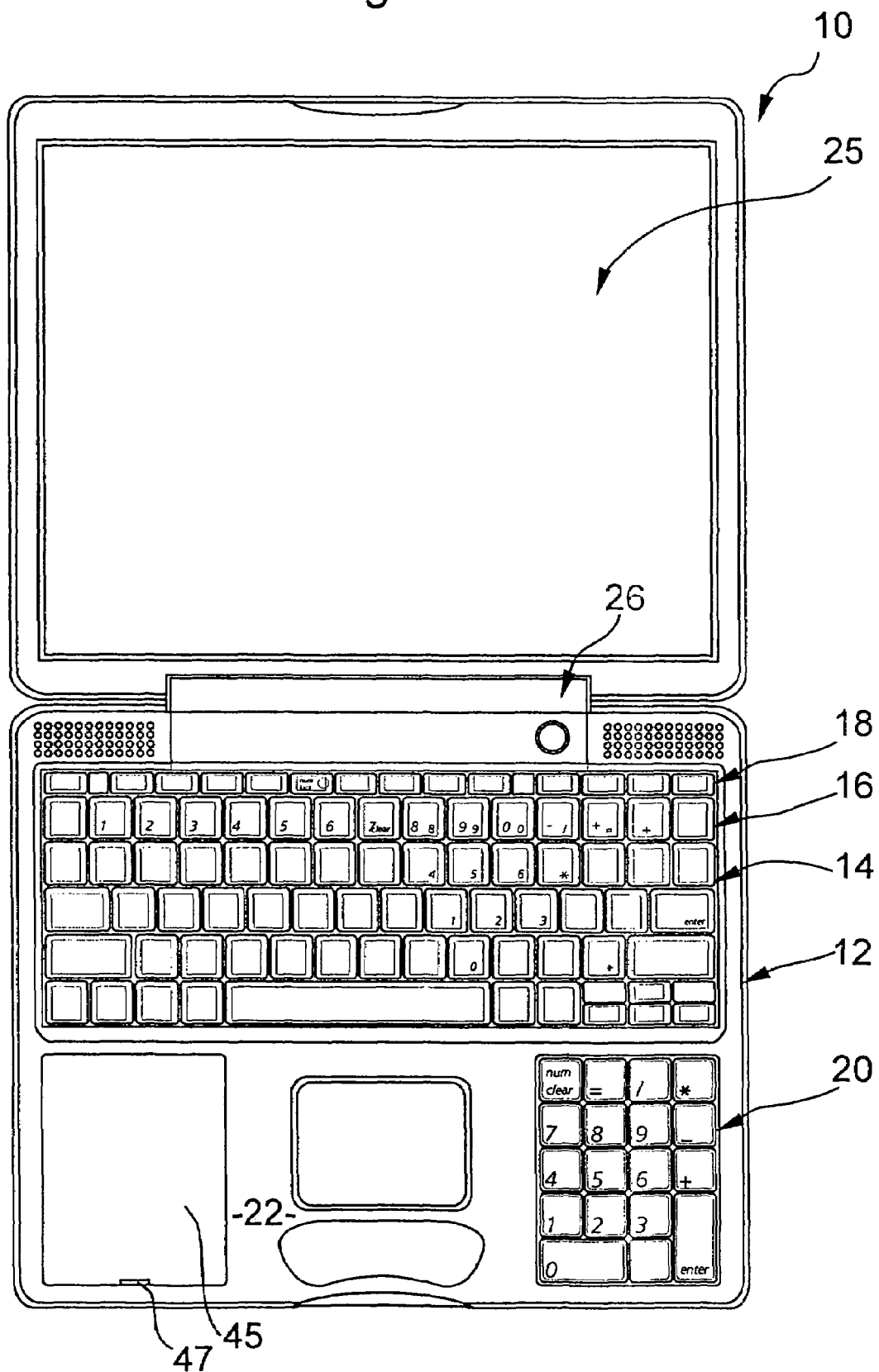
FIG. 1 is a top view of a portable computer including one auxiliary module mounted in segregated relation to an independently operative conventional keyboard.

As shown in the accompanying drawings, the present invention is directed to a modular computer user interface system particularly adapted for use in combination with a portable computer, generally indicated as 10. The portable computer 10 may be of substantially conventional design and structure, other than the implementation of the modular computer user interface system, to be described in greater detail hereinafter. Accordingly, the computer 10 includes a support platform generally indicated as 12, which has a somewhat conventional keyboard generally indicated as 14 mounted thereon. The keyboard 14 comprises a plurality of alpha-numeric keys arranged in a universal format. However, in that size is at a premium in structuring portable computers, the numerical keys respectively indicated by the numerals 1 through 0, are collectively disposed in a linear array defining the majority of the top row as at 16 of the keyboard 14 and normally located immediately below the row of function keys, generally indicated as 18. In such location access to the individual numerical keys is generally inconvenient and time consuming and therefore generally undesirable, particularly when the process being performed on the computer 10 involves repeated computation or calculation. Accordingly, in order to save space, conventional portable computers further provides for a plurality of numerical keys disposed in a secondary grouping of a more conventional multi row array. This secondary grouping is represented by numbers 0 through 9, indicated in phantom, on FIG. 1. Further, utilization of the secondary grouping of numerical keys requires activation of the "num touch" or "num lock" key as also indicated in FIG. 1. However, activation of the "num" key also serves to deactivate the alpha keys coexisting with the numerical keys in the secondary grouping. The problems presented thereby are obvious.

Accordingly, the modular computer user interface system of the present invention overcomes the disadvantages and problems associated with conventional keyboards 14 particularly, but not exclusively, of the type utilized in combination with portable computers 10. As such, at least one auxiliary module, generally indicated as 20, is integrally or separably mounted on the platform 12 in spaced, distinctly segregated relation from the conventional keyboard 14. In at least one preferred embodiment, the auxiliary module 20 is mounted in a convenient location on a palm rest portion 22, which is fixedly secured to the platform 12 in the conventional fashion.

As will be discussed in greater detail hereinafter, the present invention further includes the incorporation of an interface assembly structured to define an operative interconnection between the auxiliary module 20 and a processor associated with the computer 10 and not shown herein for purposes of clarity. By virtue of such operative connection, the auxiliary module 20 is connected in data and signal communication with the processor, in a manner similar in function but independent in operation to the conventional keyboard 14. Also, as with the conventional keyboard 14 operation or manipulation of the plurality of keys associated with the auxiliary module 20 serves to control specific functions as well as cause the display of data on a display assembly and/or display screen, generally indicated as 25 and also associated with the computer 10. In typical fashion the display assembly or screen 25 is hingedly, pivotally or otherwise movably attached to the platform 12 by appropriate mountings 26. With further reference to the embodiment of FIG. 1, the auxiliary module 20 may be fixedly or removably mounted to the platform 12 by relatively minimal structural modification of the aforementioned interface assembly.

Figure 2:
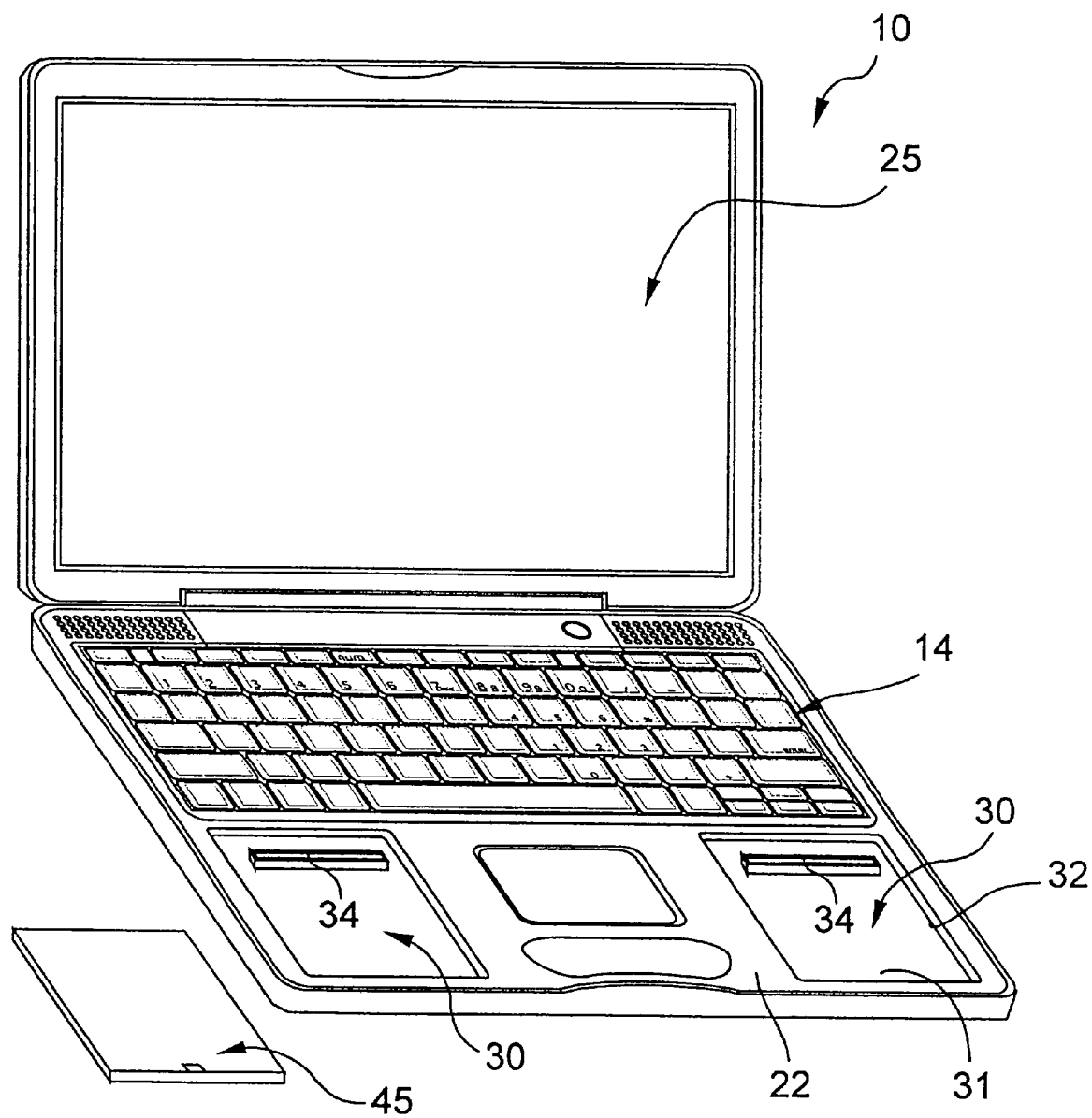
FIG. 2 is a perspective view of another embodiment of the present invention in at least partially unassembled form wherein a portion of an interface assembly is capable of removable connection to anyone of a plurality of auxiliary modules.

With reference to FIG. 2 and the additional preferred embodiment disclosed therein, it is clearly shown that the aforementioned interface assembly comprises a first adaptor preferably in the form of at least one base 30. The base 30 may include a recess area surrounded by an upwardly or outwardly extending retaining lip or wall structure 32. Further, the interface assembly includes a second adaptor structure disposed underneath, on a side, or on another appropriate portion of the auxiliary module 20, as well as any of the additional plurality of auxiliary modules 20', 20", 20''', 48, of the type disclosed in FIGS. 8A–8J. In this regard, the first adaptor 30 may include a proprietary electrical connector 34, which may be defined by anyone of a plurality of applicable electrical structures including male/female plug/port connectors, multi pin connectors, etc. The electrical connector 34 of the first adaptor 30 is cooperatively dimensioned, configured and structured to either fixedly or removably mate and accordingly be connected with a similar type connector (not shown for purposes of clarity) located on an appropriate under surface or other portion of each of the one or more auxiliary modules. Therefore, in the various embodiments of the present invention, the one or more auxiliary modules 20, 20', 20", 20''' and 48 may be interconnected by mating engagement of the electrical connectors 34 on the first adaptor base 30 and the cooperatively structured electrical connector mounted on each of the auxiliary modules, as described above. By virtue of the mating engagement between the aforementioned cooperatively structured electrical connectors found on the first adaptor base 30 and each of the aforementioned auxiliary modules, the interface assembly defines and serves to perform an operative interconnection between each of the one or more auxiliary modules and the processor of computer 10, in order to establish communication there between.

Another feature of the additional preferred embodiment of FIG. 2 includes the provision for fixedly or removably mounting a plurality of auxiliary modules on the support platform 12. As such the platform 12 and preferably the fixedly secured palm rest portion 22, is structurally modified to include the permanent or removable attachment of a plurality of first adaptor structures, each of which may be in the form of the adaptor base 30. Each of the adaptor bases 30 shown in the embodiment of FIG. 2 includes an applicable electrical connector 34 mentioned and configured to cooperatively mate in Either a fixed or removal relation with the aforementioned electrical connector secured to each of the plurality of auxiliary modules. Therefore, anyone of the auxiliary modules may fit into anyone of the recessed areas structurally defined by the first adaptor bases 30. Moreover, the aforementioned interface assembly is electrically connected to the processor, by means of the adaptor base 30, so as to define an operative interconnection between anyone or all of the auxiliary modules which are fixedly or removably mounted on the support platform 12 by being connected to one or more of the adaptor bases 30. As also set forth above, each of the adaptor bases 30 may be fixedly or removably mounted on the platform 12, preferably, but not necessarily, in a spaced apart relation on the palm rest portion 22 thereof. By virtue of this embodiment an operator of the computer 10 may independently but substantially concurrently have access to and operate anyone of the plurality of auxiliary modules electrically connected to anyone of the adaptor bases 30. Also, as with the other embodiments of the present invention, any of the auxiliary modules connected to the platform 12 by virtue of their electrical connection with the first adaptor bases 30 are operative independent of the conventional keyboard 14. It is also beneficial to note that in the illustrated embodiment wherein a pair of adaptor bases 30 are provided, facilitated use by left-handed, right-handed, and/or ambidextrous individuals can be achieved, and indeed more than one auxiliary module can be utilized simultaneously, if needed. When not in use, the adaptor bases may include a corresponding cover assembly 45. The cover assembly 45 may be structured to snap on, be hingedly connected, be screwed in place, or otherwise movably secured to cover an unused adaptor base 30. Of course, it is contemplated that the cover assembly may be modified to cover the auxiliary module as well. Further a conventional type of ejection system may be provided, such as with a button or other spring loaded system, to facilitate removal of an auxiliary module 20 as needed.

Yet another preferred embodiment of the present invention is disclosed in FIGS. 3, 4 and 4A wherein the operative interconnection of an auxiliary module generally indicated as 20 is accomplished by providing a peripheral assembly generally indicated as 40 in FIG. 3. The peripheral assembly 40 comprises anyone of the auxiliary modules 20, 20', 20", 20''', and 48 electrically connected to a first adaptor base 30' which, as set forth above, at least partially defines the aforementioned interface assembly. As stated the interface assembly is structured to accomplish an operative interconnection between anyone of the auxiliary modules which is mounted on an electrically connected to the first adaptor base 30'. As a peripheral assembly 40, interfacing with the computer 10 may be accomplished utilizing a USB connection including hard wire conductor 42 and an appropriate bus or plug 44. As is well accepted, the USB type of connection is utilized for connecting a variety of different peripherals to a computer at an acceptable data transfer rate and is structured to support the ability to automatically add and configure a variety of such peripheral devices utilizing a hot plugging technique. Further, the base 30" may be adapted, with minimal or no structural modifications to define an exterior supporting portion of the peripheral assembly 40 and still include the recess area 31 for receipt of anyone of the auxiliary modules 20, 20', 20", 20''' and 48 by interconnection thereof with the universal electrical connector 34, as described.

It is also to be noted that the peripheral assembly 40 as disclosed in the embodiment of FIG. 3 can be used independently of or in conjunction with any other auxiliary module mounting or attachment facility disposed on the platform 12 and represented in FIG. 1. Therefore, when it is desired to significantly increase the versatility or otherwise adapt a portable computer 10 to perform a variety of customized applications, the peripheral assembly 40 can be used in combination with the embodiment of FIG. 1, wherein one or more of the auxiliary modules are either fixedly or removably mounted on the platform 12 such as on the palm rest 22.

Another variation of the present invention defining yet another preferred embodiment is the combining of the peripheral assembly 40 with the embodiment of FIG. 2 such that an additional number of auxiliary modules may be independently but operatively connected to the processor of computer 10 and may be substantially concurrently operated dependent on the choice and need of the user of the computer 10.

Figure 6:
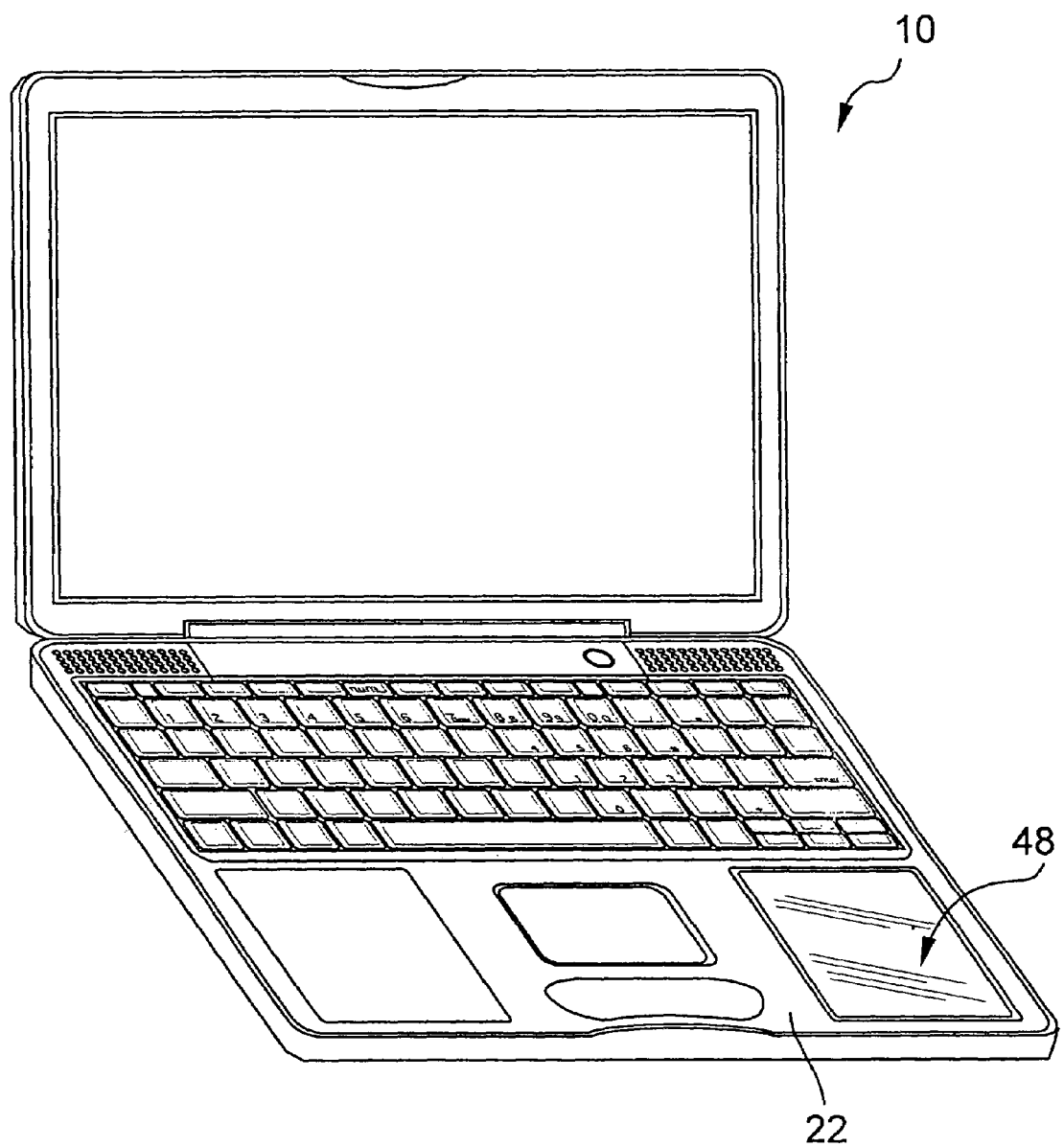
FIG. 6 is another embodiment of the present invention wherein at least one auxiliary module includes an LCD touchpad or similar programable touch pad configuration.
Figure 7:
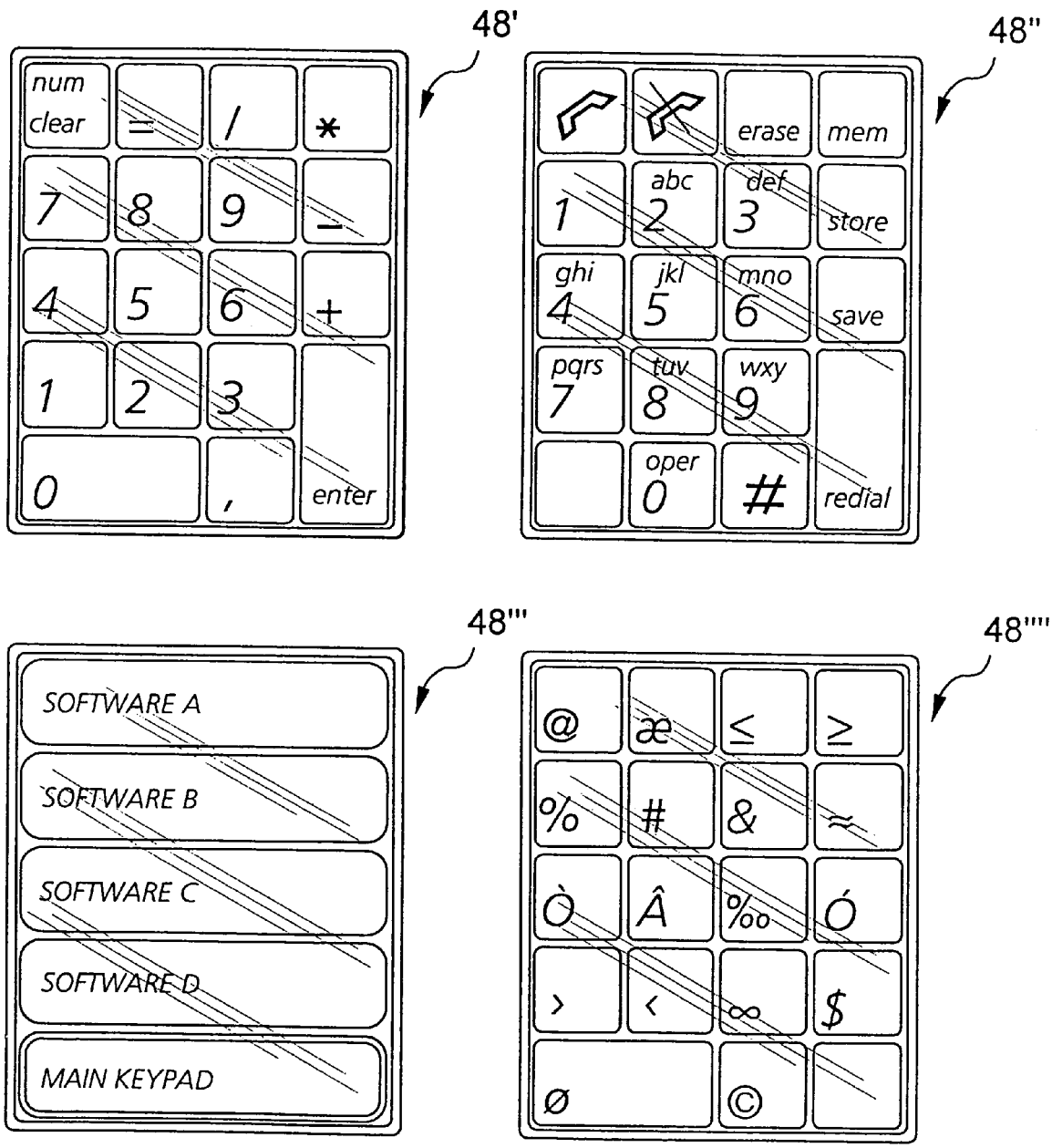
FIG. 7 is a detailed illustration of example displays and configurations for the programmable touch pad of FIG. 6.
Figures 8, 8J:
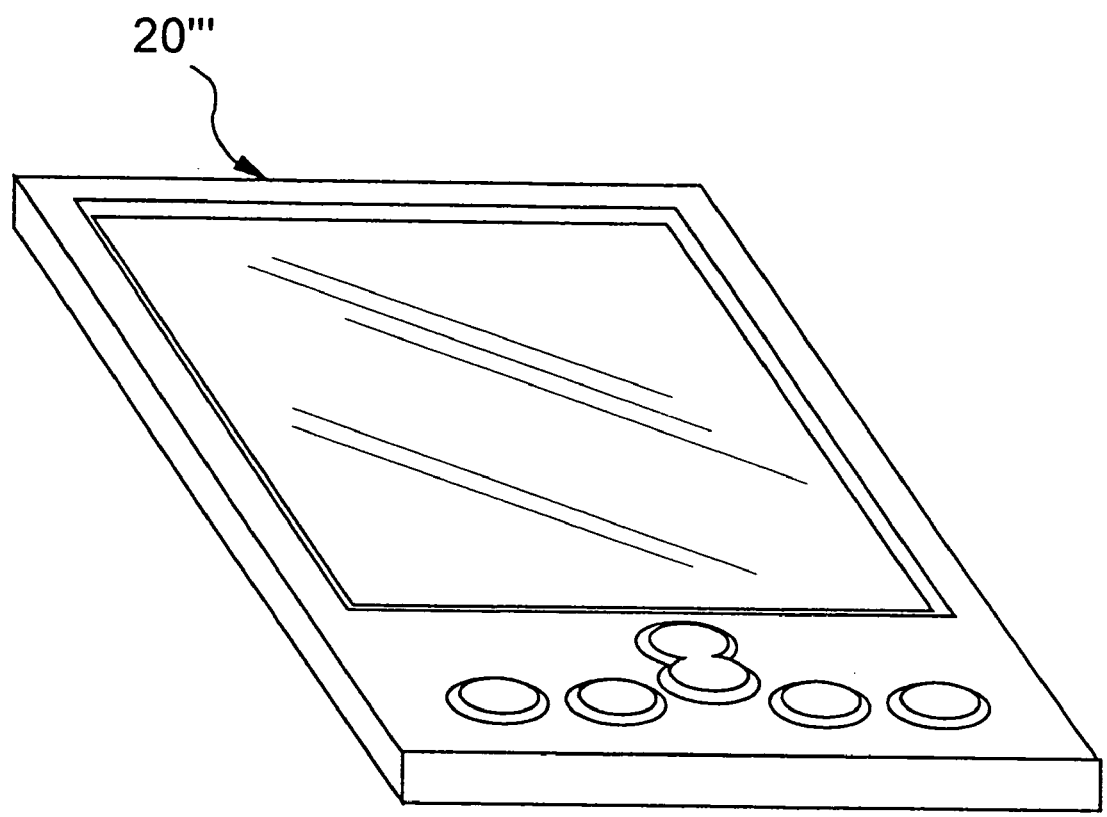

With reference to FIGS. 8A through 8J it is demonstrated that a large number of auxiliary modules 20, 20', 20", 20''' and 48 may be incorporated within the modular computer user interface system of the present invention. Further, it is emphasized that the specific auxiliary modules demonstrated are only representative of a larger number of such modules, which may be standardized or customized to perform a substantially conventional process or function. By way of example, the numerical keypad 20 is intended to be used in the manner set forth above. Alternatively, a specialized process or function may be performed with the auxiliary modules 20', 20", 20''', and 48. More specifically the auxiliary module 20' is representative of a proprietary keypad including a plurality of specific function keys 21 disposed in a predetermined array to best and most efficiently operate specialized software or process other capabilities associated with the computer 10. Similarly, auxiliary module 20" as shown in FIG. 8D is intended as a general representation of a jog/shuttle keypad structure incorporating a reversibly rotatable control member 23 as well as a plurality of function keys 21'. As such, the auxiliary module 20" may be used for a variety of related functions such as video editing, game playing, etc. Looking generally to the remaining FIGS. 8E–8J, respectively, the auxiliary module 20''' may include interfaces such as, a solar battery unit, a card reader, a calculator, telephone keypad, tablet, pda cradle/interface, etc., each interchangeably connectable via the adaptor base 30, 30'. Indeed, looking to the embodiment of FIGS. 6, 7 and 8B, a programmable touch pad 48, such as an LCD touch pad may be provided as one or all auxiliary modules. In such an embodiment, the touch pad 48 could be customizable and/or programmable to meet the specific need of one or more particular applications. Along these lines, the touch pad 48 or a similar interface may be user programmable and/or have embedded programming and/or have special programming software to be downloaded from a storage medium or remote source and/or be recognizable and customizable by programming for a specific application installed on the computer and/or may interface with an operating system of the computer for effective programming and adaptability. In this regard, FIG. 7 illustrates several examples 48', 48", 48''', 48'''' of possible programming of the touch pad 48 that may be provided, either under direct user programming or as a result of software or a specific application or article of hardware.

Figure 5:
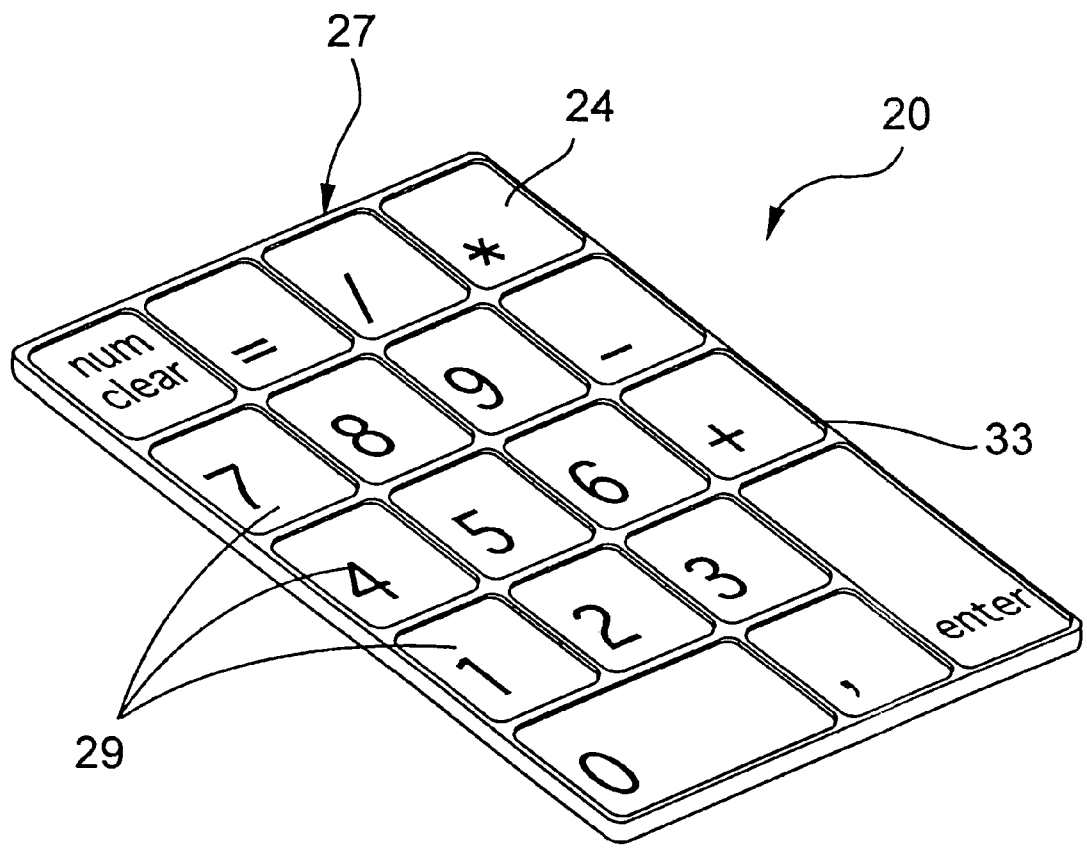
FIG. 5 is a perspective view of one embodiment of an auxiliary module comprising a plurality of keys formed as a touch sensitive keypad.

With reference to FIG. 5, yet another preferred embodiment of the present invention includes each or selected ones of the auxiliary modules, and especially the auxiliary module 20 that functions as a numeric keypad, being formed of a touch sensitive membrane 27. Although a mechanical keypad system may be used, in this embodiment each of the plurality of keys associated therewith include exposed contact portions 29 which are immovable relative to one another and disposed in a common plane. The touch sensitive membrane 27 defining one or more of the auxiliary modules may also include a border assembly which is more specifically defined by a plurality of border segments 33 at least some of which are disposed in continuously surrounding relation to the outer periphery or boundaries of each of the keys so as to surround the contact portions 29 thereof. The border segments 33 extend outwardly or upwardly from the contact portions 29 of each of the keys and serve to at least partially segregate the keys from one another 10 to facilitate the identification and/or location of the respective keys as well as their individual contact portions 29 by touch or feel. As practiced, the user typically manipulates the plurality of keys and engages the respective contact portions 29 without continuously viewing the face of the auxiliary module 20. While the plurality of border segments 33 are demonstrated as being part of a numerical keypad it is emphasized that such border segments 33 can also be used to surround and provide an indication, by feel or touch indication of each of the plurality of function keys 21, which may also be preferably part of a touch pad or touch sensitive membrane and removably disposed in a common plane.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A modular computer user interface system comprising:
   a) a processor,
   b) a platform including a keyboard mounted thereon, said processor electrically connected to and responsive of data communication from said keyboard,
   c) at least one auxiliary module secured to said platform in segregated relation to said keyboard, and
   d) an interface assembly at least partially connected to said platform and structured to operatively interconnect said auxiliary module and said processor, wherein said interface assembly includes:
      i) a first adaptor structure disposed on said platform and structured to at least partially define said operative interconnection between said processor and said auxiliary module;
      ii) a second adaptor structure disposed on said auxiliary module and structured to be communicatively associated with said first adaptor and further defining said operative interconnection between said processor and said auxiliary module;
   wherein said first adaptor structure comprises a base operatively connected to said processor and communicatively connected to said second adaptor structure of said auxiliary module, and wherein said base and said second adaptor structure are removably connectable to one another so as to collectively define said operative interconnection between said auxiliary module and said processor, and wherein said operative interconnection is further defined by said base being removably secured to said platform.

2. A modular computer user interface system as recited in claim 1 wherein said base and said auxiliary module are selectively and independently positionable into and out of operative engagement with one another.

3. A modular computer user interface system comprising:
   a) a processor operatively connected to a display device,
   b) a platform including a keyboard mounted thereon, said processor electrically connected to and responsive of data communication with said keyboard,
   c) a plurality of auxiliary modules each attachable to said platform in spaced, segregated relation to said keyboard, and
   d) an interface assembly connected to said platform and each of said auxiliary modules and structured to at least partially define an operative interconnection between each of said auxiliary modules and said processor wherein said interface assembly includes a plurality of first adaptor structures at least some of which are mounted on said platform in spaced relation to one another and a plurality of second adaptor structures each connected to a different one of said plurality of auxiliary modules.

4. A modular computer user interface system as recited in claim 3 wherein at least some of said second adaptor structures are removably attached to at least one of said first adaptor structures; at least two of said plurality of auxiliary modules being concurrently disposable into said operative interconnection with said processor.

5. A modular computer user interface system as recited in claim 4 wherein each of said first adaptor structures comprises a base, at least some of said bases mounted on said platform, each of said bases being communicatively associable to different ones of said second adaptor structures associated with corresponding ones of said auxiliary modules.

6. A modular computer user interface system as recited in claim 5 wherein each of said bases is cooperatively structured with each of said auxiliary modules to be connectable with any one of said second adaptor structures of said plurality of auxiliary modules.

7. A modular computer user interface system as recited in claim 5 further comprising at least one shield member positionable into and out of covering relation to one of said auxiliary modules which is communicably connected to one of said bases.

8. A modular computer user interface system as recited in claim 7 wherein at least one of said bases is detached from said platform and said keyboard and is communicably connected to at least one of said second adaptor structures of at least one of said auxiliary modules.

9. A modular computer user interface system as recited in claim 8 wherein said one base being detached from said platform and said keyboard and said auxiliary module connected thereto collectively define a peripheral assembly, said peripheral assembly removably connected in operative relation to said processor.

10. A modular computer user interface system comprising:
    a) a processor,
    b) a platform including a keyboard mounted thereon, said processor electrically connected to and responsive of data communication from said keyboard,
    c) at least one auxiliary module secured to said platform in segregated relation to said keyboard, and
    d) an interface assembly at least partially connected to said platform and structured to operatively interconnect said auxiliary module and said processor, wherein said interface assembly comprises a first adaptor operatively associated with said processor and a second adaptor operatively associated with said auxiliary module, and wherein said first adaptor comprises a base detached from said platform and said keyboard and electrically connected to said second adaptor of said auxiliary module.

11. A modular computer user interface system as recited in claim 10 wherein said base and said auxiliary module collectively define a peripheral assembly removably connected in operative relation to said processor.

12. A modular computer user interface system as recited in claim 11 wherein said auxiliary module is removably connected to said base.

13. A modular computer user interface system as recited in claim 12 further comprising a plurality of auxiliary modules each having a second adaptor structure, each of said plurality of auxiliary modules removably connected to said base to define said peripheral assembly therewith.

14. A modular computer user interface system comprising:
   a) a processor,
   b) a platform including a keyboard mounted thereon, said processor electrically connected to and responsive of data communication from said keyboard,
   c) at least one auxiliary module secured to said platform in segregated relation to said keyboard, wherein said auxiliary module comprises:
      i) a keypad including a plurality of keys each including a contact portion immovably disposed in coplanar relation to one another, and
      ii) a border assembly extending outwardly from a common plane of said contact portions and disposed in segregating relation to said contact portions, wherein said border assembly comprises a plurality of border segments disposed in at least partially surrounding relation to different ones of said contact portions, and
   d) an interface assembly at least partially connected to said platform and structured to operatively interconnect said auxiliary module and said processor.

15. A modular computer user interface system comprising:
   a) a processor,
   b) a platform including a keyboard mounted thereon, said processor electrically connected to and responsive of data communication from said keyboard,
   c) at least one auxiliary module secured to said platform in segregated relation to said keyboard, wherein said auxiliary module comprises:
      i) a keypad including a plurality of keys each including a contact portion immovably disposed in coplanar relation to one another, and
      ii) a border assembly extending outwardly from a common plane of said contact portions and disposed in segregating relation to said contact portions, and
   d) an interface assembly at least partially connected to said platform and structured to operatively interconnect said auxiliary module and said processor, wherein said interface assembly includes a plurality of border segments at least some of which comprise a substantially continuous configuration extending along and at least partially defining a periphery of different ones of said contact portions.

16. A modular computer user interface system comprising:
   a) a processor,
   b) a platform including a keyboard mounted thereon, said processor electrically connected to and responsive of data communication from said keyboard,
   c) at least one auxiliary module secured to said platform in segregated relation to said keyboard, wherein said auxiliary module includes a programmable touch pad, and
   d) an interface assembly at least partially connected to said platform and structured to operatively interconnect said auxiliary module and said processor.

17. A modular computer user interface as recited in claim 16, wherein programmable touch pad is customizable.

18. A modular computer user interface system comprising:
   a) a processor,
   b) a platform including a keyboard mounted thereon, said processor electrically connected to and responsive of data communication from said keyboard,
   c) at least one auxiliary module secured to said platform in segregated relation to said keyboard, wherein said auxiliary module includes a solar battery unit, and
   d) an interface assembly at least partially connected to said platform and structured to operatively interconnect said auxiliary module and said processor.

19. A modular computer user interface system comprising:
   a) a processor,
   b) a platform including a keyboard mounted thereon, said processor electrically connected to and responsive of data communication from said keyboard,
   c) at least one auxiliary module secured to said platform in segregated relation to said keyboard, wherein said auxiliary module includes a card reader unit, and
   d) an interface assembly at least partially connected to said platform and structured to operatively interconnect said auxiliary module and said processor.

20. A modular computer user interface system comprising:
   a) a processor,
   b) a platform including a keyboard mounted thereon, said processor electrically connected to and responsive of data communication from said keyboard,
   c) at least one auxiliary module secured to said platform in segregated relation to said keyboard, wherein said auxiliary module includes a calculator, and
   d) an interface assembly at least partially connected to said platform and structured to operatively interconnect said auxiliary module and said processor.

21. A modular computer user interface system comprising:
   a) a processor,
   b) a platform including a keyboard mounted thereon, said processor electrically connected to and responsive of data communication from said keyboard,
   c) at least one auxiliary module secured to said platform in segregated relation to said keyboard, wherein said auxiliary module includes a telephone keypad, and
   d) an interface assembly at least partially connected to said platform and structured to operatively interconnect said auxiliary module and said processor.

22. A modular computer user interface system comprising:
   a) a processor,
   b) a platform including a keyboard mounted thereon, said processor electrically connected to and responsive of data communication from said keyboard,
   c) at least one auxiliary module secured to said platform in segregated relation to said keyboard, wherein said auxiliary module includes a tablet, and d) an interface assembly at least partially connected to said platform and structured to operatively interconnect said auxiliary module and said processor.

23. A modular computer user interface system comprising:
  a) a processor,
  b) a platform including a keyboard mounted thereon, said processor electrically connected to and responsive of data communication from said keyboard,
  c) at least one auxiliary module secured to said platform in segregated relation to said keyboard, wherein said auxiliary module includes a cradle configured to accept a personal digital assistant (PDA) device, and
  d) an interface assembly at least partially connected to said platform and structured to operatively interconnect said auxiliary module and said processor.

* * * * *